J. H. KINSMAN.
MILK-BOILER.
No. 181,687. Patented Aug. 29, 1876.
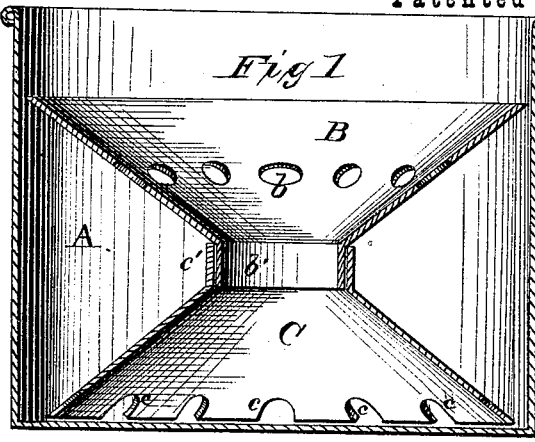
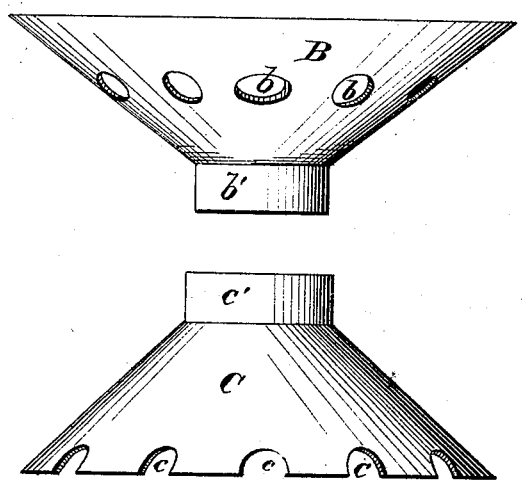
WITNESSES
Franck L. Ourand
P. McNickle
INVENTOR
John H. Kinsman.
By L. Deane.
Attorney

UNITED STATES PATENT OFFICE.

JOHN H. KINSMAN, OF SALEM, MASSACHUSETTS.

IMPROVEMENT IN MILK-BOILERS.

Specification forming part of Letters Patent No. 181,687, dated August 29, 1876; application filed June 12, 1876.

*To all whom it may concern:*

Be it known that I, JOHN H. KINSMAN, of Salem, in the county of Essex and State of Massachusetts, have invented certain new and useful Improvements in Milk-Boilers, of which the following is a specification:

Figure 1 is a vertical central section, showing the device in position for use. Fig. 2 is a perspective, showing the two cones separated.

This invention relates to that class of devices used in boiling milk or other fluids liable to boil over, and which are designed to prevent the overflow of the liquid in the ebullitions; and it consists, more particularly, in the use and employment of two truncated cones of tin or suitable material, one perforated and the other having serrations or notches on the edge of its large end, and each having at their smaller end a neck adapted to fit the one on the other, so that when in position the notched edge of the one shall be at the base and the largest end of the other at the top, substantially as and for the purposes as will now be more in detail set out and explained.

In the drawing, A denotes any convenient or usual boiler; B, the upper, and C the lower, truncated cones. The upper cone is perforated generally, as shown at $b$, and the bottom edge of the lower cone is suitably notched or serrated, as now indicated at $c$; or, if desired, the top edge or base of the upper cone may be notched or serrated in a similar manner, and practically the same results will be accomplished as with the perforations.

The two cones may be readily joined to each other by means of the necks or projections on the smaller end of each, and now indicated by letters $b'$ and $c'$. These necks are made of such relative diameters that the one is adapted to fit readily into the other, so as to hold together sufficiently firm for all purposes; but this form of connection or means of uniting the two together may be made in any analogous way, so long as the same end is accomplished; also, there may be means for making the union more secure, such as a bayonet-joint or any like easily-detachable connection.

The use and functions of said device are similar to those of analogous devices; but while mine, in common with the others, will effectually prevent the boiling over and, to a good degree, the scorching of the milk, it is possessed of very valuable advantages not heretofore shown. The two parts are easily made, by stamping or by any like way, from a single sheet of metal, and each part may be brought from its die, as now shown. Thus it can, as a whole, be produced very easily and cheaply.

In packing, the two parts will nest exactly. In use, they can always be kept clean, which, in this class of devices, is a prime essential, and not always, if ever before, attained so well as in present device.

The different sizes of the device are adapted to fit pails or vessels of any usual size.

Having thus described my device, what I consider new, and desire to secure by Letters Patent, is—

The within-described device for the use in boiling milk, consisting of truncated cone B, perforated at $b$, or with serrated base, and provided with neck $b'$, and truncated cone C, notched or serrated at $c$, and having neck $c'$, the whole constructed and combined substantially as and for the purposes set forth.

In testimony that I claim the foregoing as my own I affix my signature in presence of two witnesses.

JOHN H. KINSMAN.

Witnesses:
 WILLIAM FITCH,
 PHILIP MCNICKLE.